Feb. 29, 1944.  H. B. DENMAN  2,342,647
GASKET
Filed Dec. 26, 1941

Inventor:
Harry B. Denman,
By Cushman Darby & Cushman
Attorneys.

Patented Feb. 29, 1944

2,342,647

UNITED STATES PATENT OFFICE 2,342,647

GASKET

Harry B. Denman, Detroit, Mich., assignor to Detroit Gasket & Manufacturing Company, Detroit, Mich., a corporation of Michigan Application December 26, 1941, Serial No. 424,514

1 Claim. (Cl. 288—33)

The present invention relates to cork composition gaskets particularly for bearing seals and an improved method of making the same. Heretofore such gaskets have either been individually molded from a mass of cork granules and binder or a block of the molded composition has been severed into a sheet and gaskets stamped out from the same. These methods are expensive from the standpoint of time, and in the case of a gasket stamped from a sheet, the procedure is necessarily wasteful of material. Moreover, the character of gaskets which may be produced by stamping from a sheet is limited in that it is impractical to die cut a gasket having a flange width narrower than the thickness of the gasket. It is likewise most difficult to produce such a gasket by molding.

The principal object of the present invention is to provide gaskets, for instance, a ring gasket which is formed as a highly compressed body composed of convolutions of continuous cork composition sheet with a suitable binder between the convolutions for adhering the same, so that the gasket is substantially an integral structure.

Another object of the invention is to provide a cork composition gasket of the character described which exhibits enhanced compressibility or resilience and of particular importance has a marked resistance to extensibility, i. e., tendency to squeeze or flow out when compressed between joint surfaces.

Of equal importance with the foregoing, it is an object of the invention to provide an improved method of forming cork composition gaskets having a coil structure as described.

An additional object of the invention is to provide a method by which gaskets of any required thickness and flange dimension can be produced from cork composition, e. g., gaskets having a flange width narrower than the thickness of the gasket.

Referring to the drawing.

Figure 1:
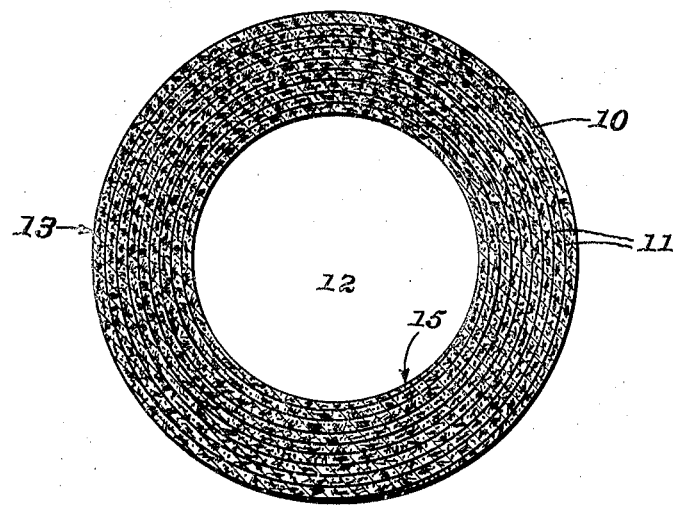
Figure 1 is a sectional view of my improved gasket.

While I have illustrated in the drawing a ring type of gasket, it is to be understood that gaskets of any required shape may be made according to this invention and I am not limited to the ring gasket illustrated.

Figure 3:
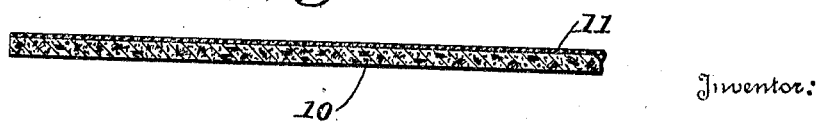
Figure 3 is a fragmentary sectional view of the adhesive coated stock material used for making up the gasket.

In carrying out the invention, a block of cork composition such as the commercially available product is severed into a continuous sheet 10 having for example, a thickness of the order of $\frac{1}{32}''$ as shown in Figure 3. This sheet thickness may be varied as required. If it is not convenient to produce the sheet from a cork composition block, the same can be obtained from any other source, so long as it has the required length. Instead of stamping out gaskets from the sheet which is the customary procedure, the sheet is now coated on one side with an adhesive 11, preferably of a thermosetting character. This binder may be in the form of a powder or a liquid adhesive. Ordinary adhesives of the glue type are satisfactory but it is preferred to employ synthetic resins of the thermosetting type having resistance to water, oils and solvents as well as high and low temperatures, i. e., resistant to chemical action and temperature conditions which may be encountered.

The coated sheet is tightly rolled or coiled up on a mandrel having an outside diameter equal to the inside diameter of the gasket opening 12, and the convolutions of the continuous sheet are built up into a tube 13 of a thickness slightly greater than the desired flange width. Then the coil or laminated tube on the mandrel is wrapped with cloth tape or placed in a mold to compress the plies or convolutions into intimate contact and subjected to heat where necessary to set the binder securely. After removal from the mold or after removing the wrapper following setting of the binder, the assembly is ground to smooth the outside and to insure an accurate flange dimension.

Figure 2:
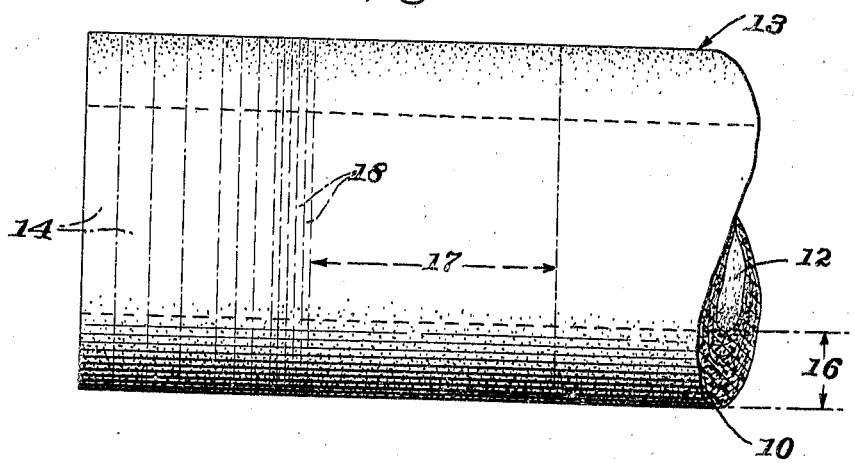
Figure 2 is a plan view of a tube of the convoluted cork composition from which gaskets of any desired thickness may be sliced.

The tube 13 thus formed is placed in a lathe of any suitable character and as the same is rotated, rings 14 of any desired thickness are cut with a conventional type of knife as illustrated in Figure 2. By this method the tube will conform to the exact size and contour of a bearing and the wall 15 of the opening 12 will be smooth and the opening will be of a size that a shaft will exactly fit therein.

As explained above, this invention makes it practical to cut a gasket having a flange width narrower than the thickness of the gasket e. g. a gasket having a flange width 16 of $\frac{1}{8}''$ and length 17 of several inches can be produced by this method as indicated in Figure 2 where the showing is exaggerated for purposes of illustration. Likewise, the gasket width 16 may be substantially greater than the narrow gasket length 18 as also illustrated in Figure 2.

It will be noted that there is no waste and instead of having to mold gaskets individually, the method is rapid where the rings either are all to have the same thickness or varied thicknesses as shown in Figure 2.

The product, as illustrated in Figure 1, is a substantially integral structure, the adhesive forming a relatively thin film and being present in amount to effectively bind the convolutions together. Close inspection is necessary to detect the convolute or coil character of the gasket because the convolutions of the continuous sheet are so intimately associated with each other. Aside from enhanced resiliency, the gasket exhibits the unexpected and marked result of being inextensible when compressed between the flanges of a joint. Even under severely high sealing pressures, there is no tendency of the gasket to distort and squeeze out between the joint surfaces which would seriously interfere with the maintenance of a tight seal. The gasket made in accordance with the present invention withstands severe bolt pressures without distorting as well as high internal pressures and can be drawn down to a definite predetermined position to take care of many precise sealing conditions found in automotive and airplane installations. For instance, a gasket as described herein will conform to the shape and exact size of a bearing and moreover, the inside surface 15 of the gasket is smooth and will exactly fit the shaft thus eliminating leakage.

A split gasket can be produced in the same manner by cutting the annular rings to the desired length.

I claim:

A bearing seal gasket formed of a continuous strip of thin cork composition, said gasket composed of continuous overlapped convolutions of said strip compressed together into a coil body, a thermosetting synthetic resin between the abutting surfaces of the convolutions of the compressed body for adhering the convolutions together into a substantially integral structure characterized by compressibility and resilience, the adhesive forming a relatively thin film present between the convolutions of the gasket and being in amount effective to bind the convolutions together and provide with the cork composition convolutions a gasket resistant to flowing out when compressed between joint surfaces.

HARRY B. DENMAN.